(12) United States Patent
Munz

(10) Patent No.: US 7,717,003 B2
(45) Date of Patent: May 18, 2010

(54) MEASURING DEVICE FOR DETECTING THE STATE OF WEAR OF THE BORE WALLS OF TWO INTERPENETRATING HOUSING BORES

(75) Inventor: Rainer Munz, Murrhardt (DE)

(73) Assignee: Coperion GmbH, Stuttgart (DE)

( * ) Notice: Subject to any disclaimer, the term of this patent is extended or adjusted under 35 U.S.C. 154(b) by 424 days.

(21) Appl. No.: 11/692,247

(22) Filed: Mar. 28, 2007

(65) Prior Publication Data

US 2007/0227275 A1    Oct. 4, 2007

(30) Foreign Application Priority Data

Mar. 31, 2006    (EP)    .................................. 06006822

(51) Int. Cl.
*G01M 19/00*    (2006.01)
(52) U.S. Cl. .................................................... 73/865.8
(58) Field of Classification Search .................. None
See application file for complete search history.

(56) References Cited

U.S. PATENT DOCUMENTS 6,249,007 B1    6/2001    Gooch

| 2004/0016139 | A1* | 1/2004 | Lam et al. ..................... 33/544 |
| 2004/0173116 | A1* | 9/2004 | Ghorbel et al. .......... 104/138.2 |
| 2005/0115337 | A1* | 6/2005 | Tarumi ....................... 73/865.8 |
| 2006/0266134 | A1* | 11/2006 | MacMillan et al. ........ 73/865.8 |

FOREIGN PATENT DOCUMENTS

| JP | 2004098444 | 2/2004 |
| JP | 2006029865 | 2/2006 |
| WO | 9503526 | 2/1995 |

OTHER PUBLICATIONS

Search report from Parent EU case 06006822.8.
Search report from Parent EU case 06006822.8, Mar. 2006.

* cited by examiner

*Primary Examiner*—Robert R Raevis
(74) *Attorney, Agent, or Firm*—James B. Conte; HBSWK

(57) ABSTRACT

A measuring device for detecting the state of wear of the bore walls of two interpenetrating housing bores, having mutually parallel bore axes, of at least two-shaft screw extruders has a carriage provided with rear drive wheels, front guide wheels and contactlessly operating distance sensors which can each be pivotally driven about a bore axis and can be positioned at a distance from the respective bore wall.

10 Claims, 4 Drawing Sheets

MEASURING DEVICE FOR DETECTING THE STATE OF WEAR OF THE BORE WALLS OF TWO INTERPENETRATING HOUSING BORES

BACKGROUND OF THE INVENTION

Field of the Invention

The invention relates to a measuring device for detecting the state of wear of the bore walls of two interpenetrating housing bores, having mutually parallel bore axes, of at least two-shaft screw extruders.

Two-shaft and multi-shaft screw extruders have a broad range of overall sizes, namely from the smallest laboratory machines having bore diameters in the range of from 15 to 20 mm to large-scale machines having bore diameters of up to 400 mm. The screws rotating in the housing bores, in conjunction with the material processed or machined therein, cause wear to the bore walls. This gives rise to variations in the diameters of the housing bores and the screws. Whereas the screws are occasionally withdrawn, cleaned and if necessary calibrated, detecting wear of the bore walls is difficult. In practice, this requires the housings, which are generally constructed from individual housing sections, to be completely disassembled.

With known mechanical measuring sensors, measuring the housing bores when the extruder housings are assembled is very difficult, as the sensors can remain suspended in the inlet and degassing openings. It is often impossible clearly to define the respective measuring planes and the respective measuring points on the circumference. In addition, material residues on the bore walls inevitably cause measurement errors.

Also known are movable cylindrical bore measuring heads each having two capacitive distance measuring sensors having merely a narrowly delimited measuring range, so almost every size of extruder requires its own measuring head. In addition, only one housing bore can be measured at a time. Each time the measuring sensor passes through the housing bore, the measurement can be carried out merely in predetermined angular position relative to the bore axis. The measuring sensor therefore has to pass through each housing bore a relatively large number of times.

SUMMARY OF THE INVENTION

The object of the invention is to provide a measuring device of the general type allowing the complete actual geometry of two bore walls to be detected in a single operation.

According to the invention, this object is achieved by a measuring device for detecting the state of wear of the bore walls of two interpenetrating housing bores, having parallel bore axes, of at least two-shaft screw extruders, which device has a carriage, with rear drive wheels which are arranged on drive axles, the length of which is variable, with front guide wheels which are arranged on front axles, the length of which is variable, and with contactlessly operating distance sensors which each are pivotally drivable about a bore axis and are positionable at a distance from neighbored bore wall. The two distance sensors are located in a common measuring plane. On continuous advancement of the measuring device, the entire profile of the bore walls is detected approximately in the manner of a partial helical line, from gusset to gusset in each case. On the other hand, individual measuring planes can be approached and then measured exactly. The axles, the length of which may be varied, allow very simple adaptation to differing diameters of the bores in the extruder housing.

The construction of the measuring device in which the carriage comprises modules and in which the carriage comprises a drive module with the drive wheels, a guide module with the guide wheels and a sensor module with the distance sensors allows a particularly simple construction of the measuring device. The developments in which the drive wheels and the guide wheels are exchangeable, in which the distance sensors are arranged on pivot arms which are pivotable about a bore axis and the length of which is variable, in which the pivot arms are each arranged on an angular gear connected to a common pivot drive via a shaft, the length of which is variable and in which the distance between the modules is variable allow particularly simple adaptation to differing diameters of the bores in the extruder housing or to differing distances between the axes of the bores. A measuring device in which the front guide wheels have an oblique camber or track provides simple centering of the gear wheels and therefore of the measuring device in the bores.

A measuring device in which a distance measuring means is associated with the rear drive wheels and a measuring device associated with the distance sensors being a position transmitter detecting an angular position thereof show how the measured values are detected.

Further features, advantages and details of the invention will emerge from the following description of an embodiment given with reference to the drawings.

DESCRIPTION OF THE PREFERRED EMBODIMENT

Figure 1:
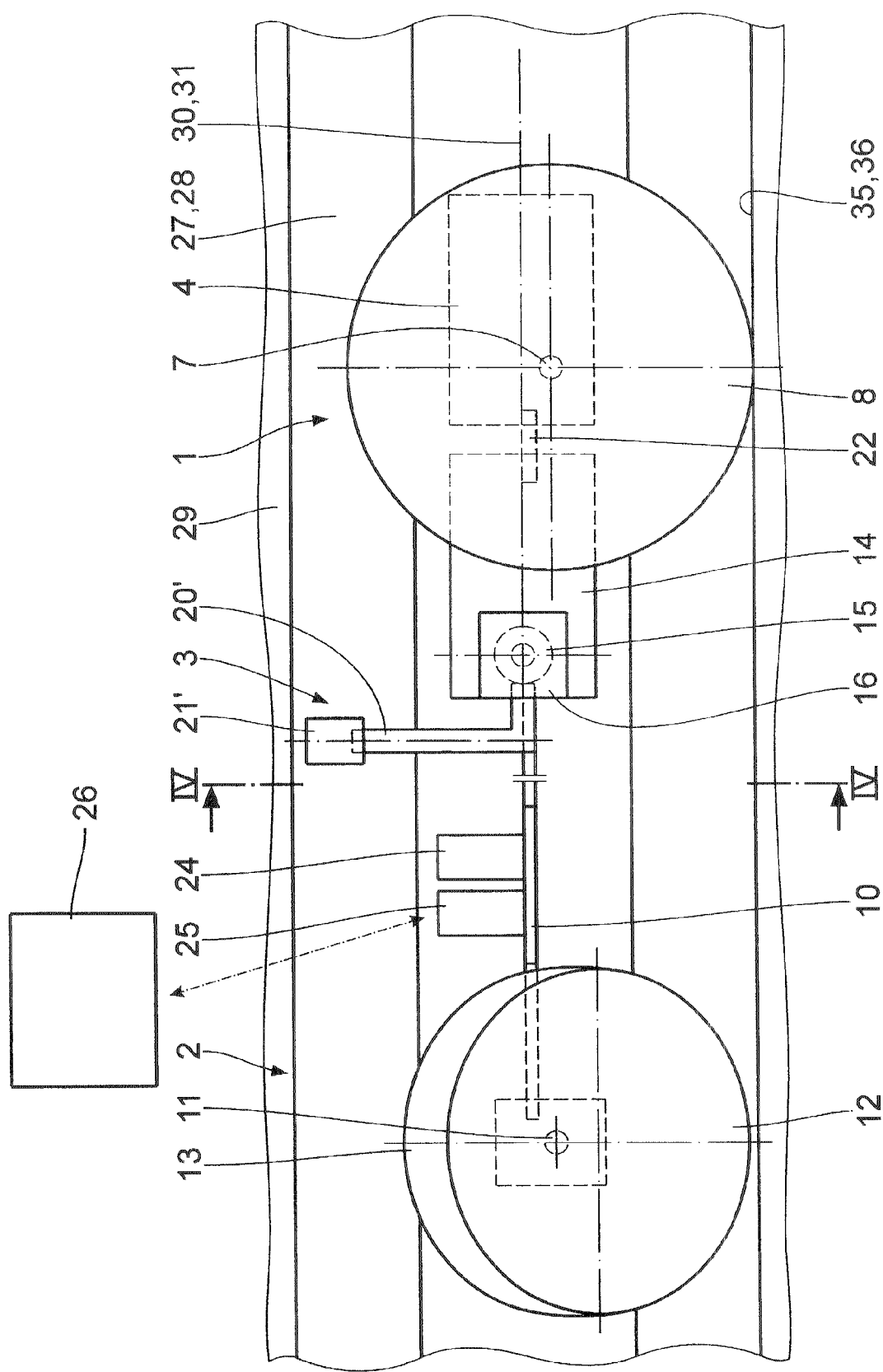
FIG. 1 shows a schematic lateral longitudinal view of a measuring device according to the invention.
Figure 2:
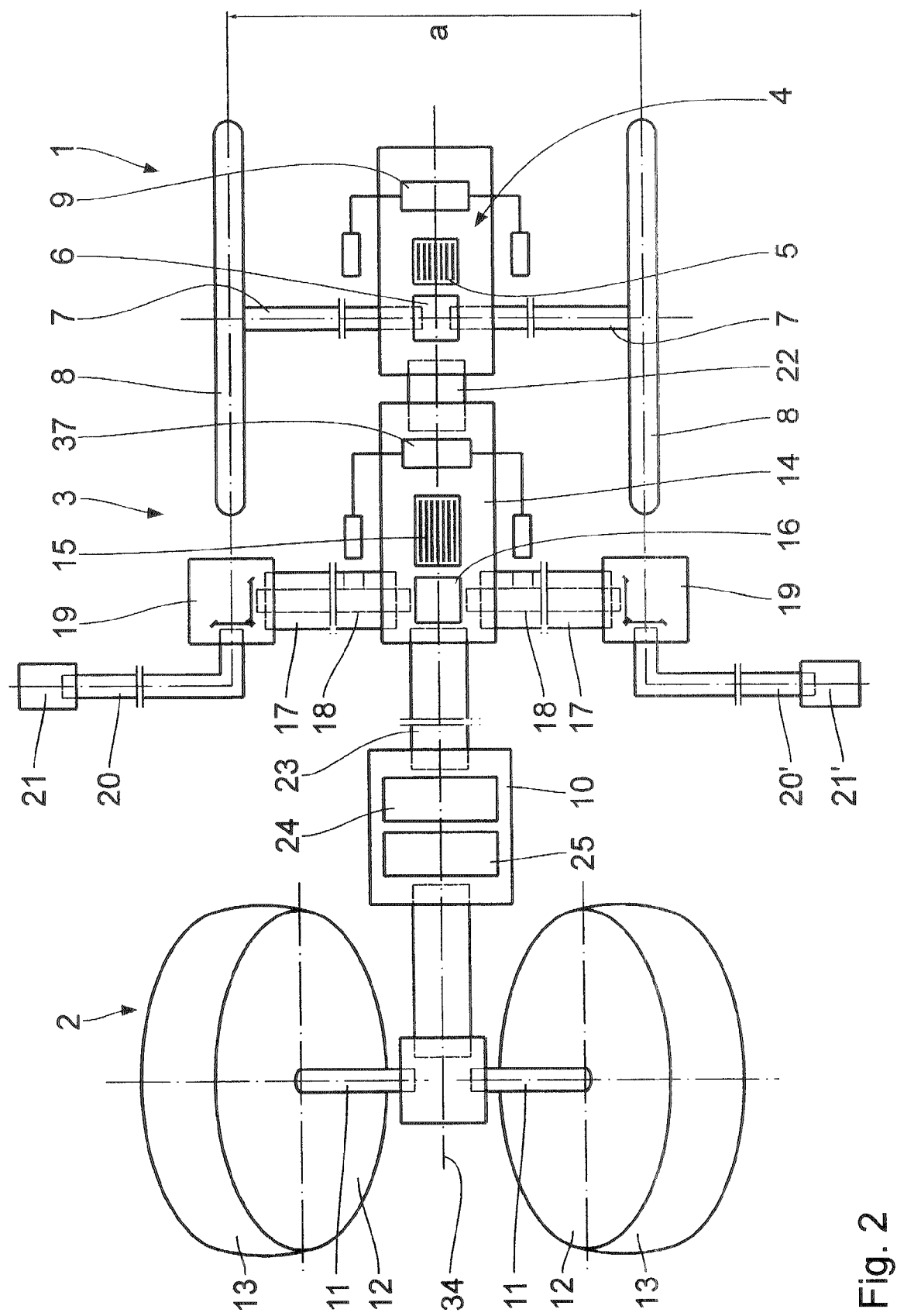
FIG. 2 shows a plan view onto the measuring device.

The basic construction of the measuring device shown in the drawings consists of three modules, namely a rear drive module 1, a front guide module 2 and a central sensor module 3.

The drive module 1 has a central drive unit 4 having an electric motor as the drive motor 5 and a reduction and differential gear 6 downstream therefrom. Guided out of the gear 6 are rear drive axles 7, attached to the outer ends of which are drive wheels 8. The axles 7 can be inserted into the gear 6 or be extendable in a different manner, so the track width a of the drive wheels 8 can be varied by appropriately extending the axles 7. In conjunction with the exchange or the extension of the axles 7, the drive wheels 8 are also exchanged and replaced in each case by wheels of differing diameter b. The drive unit 4 also has a distance measuring means 9 which issues in a conventional manner a large number of signals, i.e. conventionally 512 signals, per revolution of each axle 7, from which, in conjunction with the respective diameter b of the drive wheels 8, the distance covered can be determined.

The guide module 2 has a base frame 10 to which there are attached front axles 11 having at their free ends a respective guide wheel 12. In order to allow their track width also to be varied, the front axles 11 are either insertably fastened to the base frame 10 or else extendable.

Figure 3:
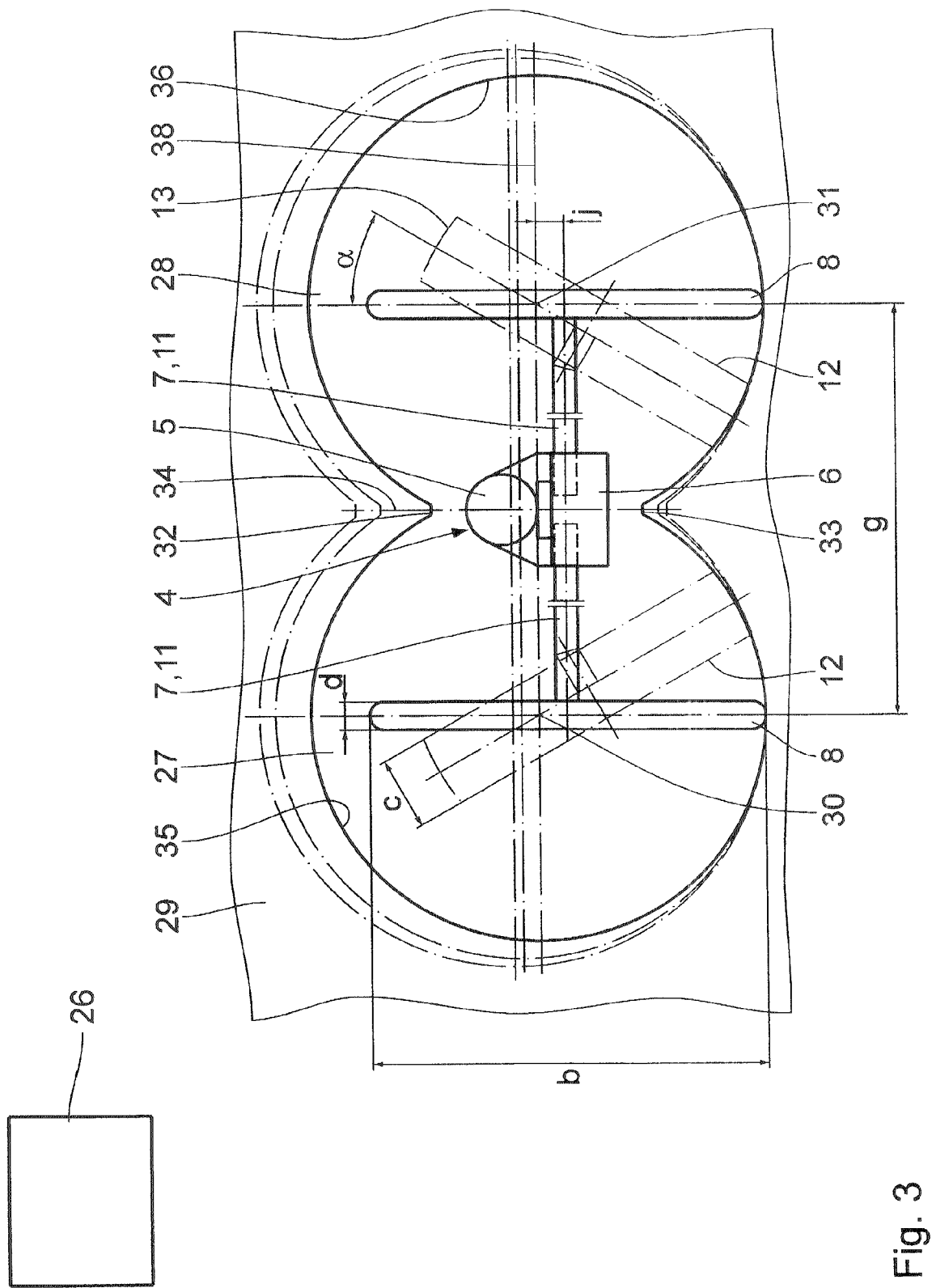
FIG. 3 shows a front view showing primarily the wheels of the measuring device.

As may be seen in FIG. 3, the width c of the guide wheels 12 is much greater than the width d of the drive wheels 8. As may also be seen in FIG. 3, the drive wheels 8 are arranged parallel to each other. The guide wheels 12, on the other hand, are inclined relative to the drive wheels 8 by a camber angle α, so their underside is located in each case between the drive wheels 8. The camber angle α is identical for both guide wheels 12. The running face 13 of the guide wheels 12 is curved. Instead of a camber angle α, the guide wheels can also have a track angle, i.e. they can approach each other toward the front. The wheels 8 and 12 preferably have rubber tyres.

The sensor module 3 has a base plate 14 on which there are arranged an electric motor as the pivot drive 15 and a reduction and power take-off gear 16. Insertably attached to the gear 16 are stay pipes 17 in which a respective shaft 18 is arranged. Attached to the outer ends of the stay pipes 17 is in each case an angular gear 19 into which the respective shaft 18 is guided. Attached to the output of each angular gear 19, so as to rotate through 360°, is a pivot arm 20, 20' which is driven by the motor 15 via the shaft 18 and the gear 19. Attached to the respective outer end of each pivot arm 20, 20' is a distance sensor 21, 21'. The stay pipes 17 with the shafts 18 are insertable and therefore exchangeable in each case. Similarly, the pivot arms 20, 20' are also attachable and therefore exchangeable.

The drive module 1 is connected to the sensor module 3 via a detachable and exchangeable connecting part 22. The sensor module 3 is connected to the guide module 2 in a corresponding manner using an exchangeable connecting part 23.

Arranged on the base frame 10 of the guide module 2 is a power supply unit 24 via which the motors 5 and 15 are powered. The power supply unit therefore consists substantially of a battery. Obviously, it is also possible for the motors 5 and 15 to be supplied with electric current via guided electrical lines (not shown). Also provided on the base frame 10 of the guide module is a radio control unit 25 which both forwards the measurement data generated in the form of signals, to a central operating and control unit 26 and also provides the motors 5 and 15 with the requisite control data.

The measuring device is used to measure the diameters e and f of the bores 27, 28 in an extruder housing 29. The bores 27, 28 have mutually parallel axes 30, 31 and penetrate each other to form gussets 32, 33 so the distance g between the axes 30, 31 is smaller than e or f, e and f obviously being identical when the housing 29 is as it should be. The briefly described geometry of an extruder housing 29 is in practice generally conventional, so further discussion thereof can be dispensed with. Instead of two bores 27, 28, three or more bores can also be arranged adjacently to one another, the axes 30, 31 each being arranged in a common horizontal plane.

During advancement longitudinally through an extruder housing 29, the measuring device is driven via the drive module 1, the distance covered and therefore also the respective location of the measuring device being exactly detected—starting from the start of the bores 27, 28—using the distance measuring means 9. As may be seen from FIG. 3, the track width a of the drive wheels corresponds exactly to the axial distance g between the bores 27, 28.

The measuring device is guided and centred, so as to be arranged precisely mirror-symmetrically to a centre plane 34 passing through the gussets 32, 33, via the guide wheels 12 which are inclined relative to the vertical and the running faces 13 of which are adjacent to the gussets 32, 33, as may be seen from FIG. 3. The curvature of the running faces 13 corresponds to the curvature of the respective bore wall 35, 36. As stated hereinbefore, the guiding and centering can be achieved not only through a corresponding camber angle α but also through a corresponding track angle of the guide wheels 12.

Figure 4:
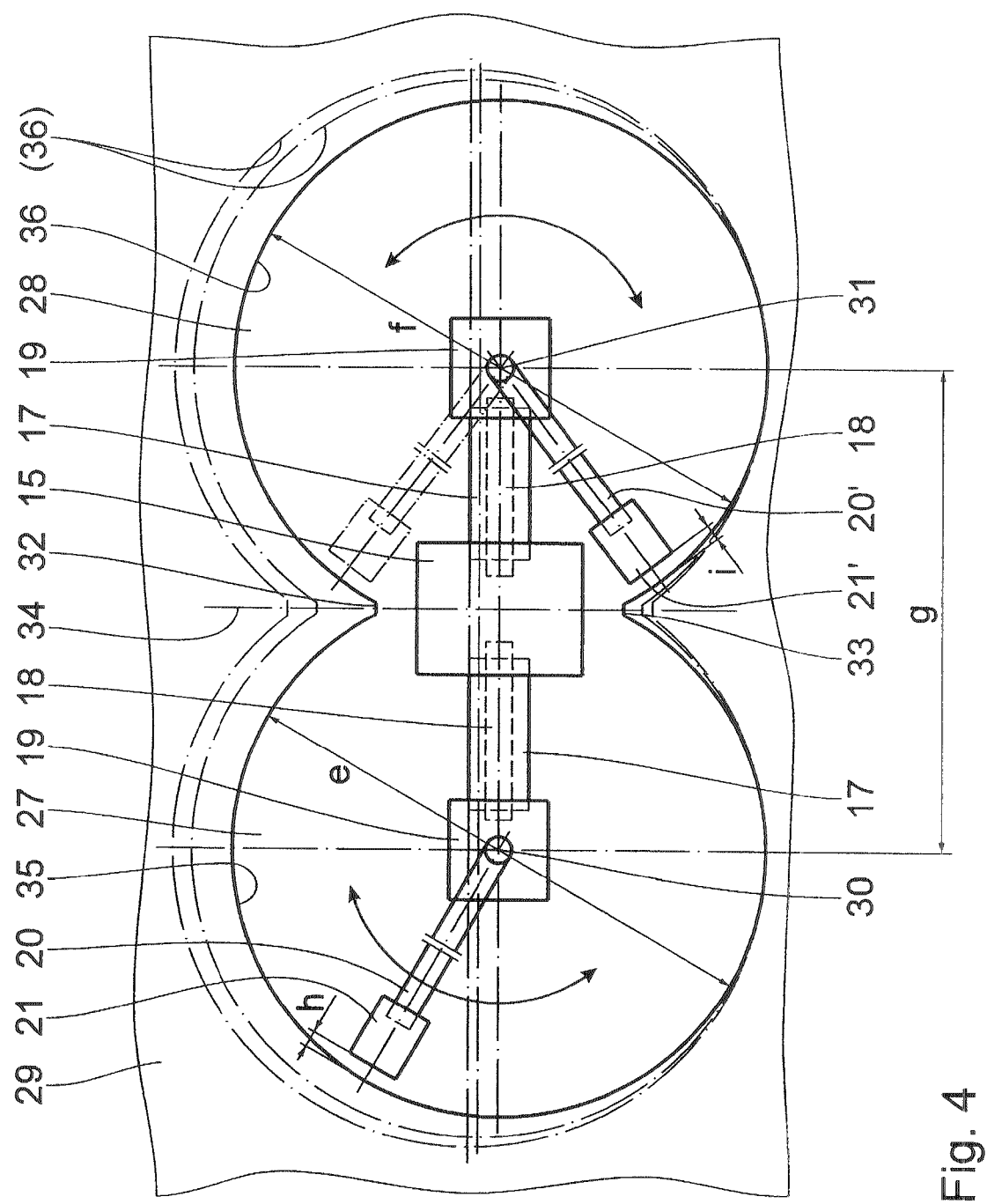
FIG. 4 shows a cross-section, taken along the section line IV-IV in FIG. 1 through the measuring device.

During advancement, the pivot arms 20, 20' with the distance sensors 21, 21' are pivoted in opposite directions, in the directions of the double-headed arrows in FIG. 4 from gusset 32 to gusset 33 and, conversely, along the bore wall 35 or 36 respectively. In this case, the distance sensors 21, 21' respectively detect the distance h or i from the bore wall 35 or 36. As the pivot axes of the pivot arms 20, 20' extend coaxially with the axes 30 and 31 of the bores 27, 28, changes in the diameter e or f of the bore are thereby detected. As the sensor module 3 is also provided with a position transmitter 37, which continuously issues a large number of signals during each pivoting movement of the pivot arms 20, 20', the diameter e or f, respectively, of the bores 27, 28 can be measured exactly over the circumference of each bore wall 35 or 36 and, in conjunction with the distance measuring means 9, over the length of the bores 27, 28. The actual geometry of the bores 27, 28 can therefore be detected precisely. The measured values are forwarded to the central operating and control unit 26 via the radio control unit 25.

As will be apparent from the foregoing, the measuring device described can be used for bores 27, 28 in extruders having any desired diameters or distance between the axles. Only a few parts have to be exchanged.

For any desired overall size of an extruder within specific overall size ranges, i.e. for any bore diameter e, f falling within this range and for any desired distance g between the axles, the following components are identical:
  drive module 1 except for the drive axles 7 and the drive wheels 8
  guide module 2 except for the front axles 11 and the guide wheels 12
  sensor module 3 except for the stay pipes 17, the shafts 18 and the pivot arms 20, 21

For any extruder overall size within the aforementioned overall size range and having an identical distance g between the axles but a differing bore diameter e, f (see FIGS. 3 and 4), the following components are also identical:
  connecting parts 22, 23
  stay pipes 17 and shafts 18

In order for the pivot axes of the pivot arms to coincide in each case in an identical manner with the axes 30, 31 of the housing bores 27, 28, the axles 7 and 11 have to have a uniform vertical distance j from a horizontal centre plane 38 spanned by the bore axes 30, 31. The wheels 8, 12 are to be chosen accordingly in each case.

What is claimed is:

1. A measuring device for detecting the state of wear of the bore walls of two interpenetrating housing bores, having parallel bore axes, of at least two-shaft screw extruders, which device has a carriage,
  with rear drive wheels which are arranged on drive axles, the length of which is variable,
  with front guide wheels which are arranged on front axles, the length of which is variable, and
  with contactlessly operating distance sensors which each are pivotally drivable about a bore axis and
  are positionable at a distance from neighboured bore wall and, wherein the distance sensors are arranged on pivot arms which are pivotable about a bore axis and the length of which is variable.

2. A measuring device according to claim 1, wherein at least one of said drive wheels, guide wheels, and distance sensors form a component of a module.

3. A measuring device according to claim 2, wherein said drive wheels form a component of a drive module, said guide wheels form a component of a guide module, and said distance sensors form a component of a sensor module.

4. A measuring device according to claim 3, wherein the distance between the modules is variable.

5. A measuring device according to claim 2, wherein the distance between the modules is variable.

6. A measuring device according to claim 1 wherein the drive wheels and the guide wheels are exchangeable.

7. A measuring device according to claim 1, wherein the pivot arms are each arranged on an angular gear connected to a common pivot drive via a shaft, the length of which is variable.

8. A measuring device according to claim 1, wherein the front guide wheels form a camber angle or a track angle.

9. A measuring device according to claim 1, wherein a distance measuring means is associated with the rear drive wheels.

10. A measuring device according to claim 1, wherein associated with the distance sensors is a position transmitter detecting an angular position thereof.

* * * * *